United States Patent [19]

Bromwich et al.

[11] 4,161,640
[45] Jul. 17, 1979

[54] ORBITAL WELDING TORCH

[75] Inventors: Robert A. C. Bromwich, Marlow; William G. Hill, Beckenham; Charles M. Lawrence, Horsham, all of England

[73] Assignee: Foster Wheeler Energy Corporation, Livingston, N.J.

[21] Appl. No.: 804,198

[22] Filed: Jun. 6, 1977

[30] Foreign Application Priority Data

Jun. 4, 1976 [GB] United Kingdom ............... 23252/76

[51] Int. Cl.² .......................................... B23K 37/02
[52] U.S. Cl. ................. 219/60 A; 219/60 R; 219/124.1; 219/125.11; 219/161
[58] Field of Search ............... 219/60 A, 60 R, 61, 219/124.1, 124.31, 125.11, 159, 161

[56] References Cited

U.S. PATENT DOCUMENTS

| 2,894,111 | 7/1959 | McNutt | 219/125.11 X |
|---|---|---|---|
| 3,035,147 | 5/1962 | Latter | 219/125.11 X |
| 3,636,294 | 1/1972 | Peyrot | 219/60 A |
| 3,688,069 | 8/1972 | Kazlauskas | 219/60 A |
| 3,815,807 | 6/1974 | Bartley | 219/125.11 X |
| 4,038,509 | 7/1977 | Henderson | 219/60 A |
| 4,040,557 | 8/1977 | Heverly | 219/125.11 X |

FOREIGN PATENT DOCUMENTS 329991  10/1972  U.S.S.R. .................. 219/60 R

Primary Examiner—Richard R. Kucia
Attorney, Agent, or Firm—Marvin A. Naigur; John E. Wilson; John J. Herguth, Jr.

[57] ABSTRACT

The orbital welding torch described herein has a horseshoe shaped body arranged to engage partially around the tubes to be butt welded when inserted from one side of the tubes, and a crescent shaped table carrying a welding head which is rotatably carried by the body so that rotation of the table relative the body orbits the welding head around the region of the weld, the open mouth of the table being capable of alignment with the open mouth of the body to enable the body to be inserted from one side of the tube to engage partially around the tubes. In order to hold the torch in alignment with the tubes during a butt welding operation clamping blocks are provided which move in a direction substantially diametric relative the tubes once the torch is in position to make a weld and is substantially transverse to the direction of insertion of the horse-shoe shaped body whereby, once the torch has been inserted from one side of the tubes so that the body extends partially around the tubes, the blocks can be clamped onto the tubes to hold the torch in place during the making of a weld.

16 Claims, 7 Drawing Figures

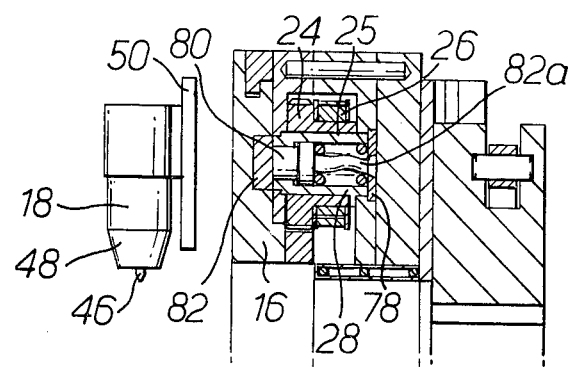
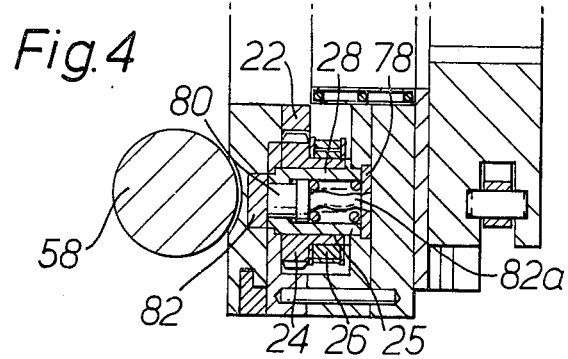
Fig. 4
Fig. 5

ORBITAL WELDING TORCH

This invention relates to the butt welding of tubes to one another and in particular to an orbital welding torch for use in making those types of welds.

BRIEF SUMMARY OF THE INVENTION

According to the invention there is provided an orbital welding torch comprising a horse-shoe shaped body arranged to engage partially around the tubes to be butt welded when inserted from one side of the tubes, a crescent shaped table carrying a welding head and rotatably carried by the body so that rotation of the table relative the body orbits the welding head around the region of the weld, the open mouth of the table being capable of alignment with the open mouth of the body to enable the body to be inserted from one side of the tube to engage partially around the tubes, clamping blocks arranged to move in a direction which is substantially diametric relative the tubes when the torch is in position to make a weld and is substantially transverse to the direction of insertion of the horse-shoe shaped body whereby, once the torch has been inserted from one side of the tubes so that the body extends partially around the tubes, the blocks can be clamped onto the tubes to hold the torch in place during the making of a welding.

BRIEF DESCRIPTION OF THE DRAWINGS

An embodiment of such an orbital welding torch according to the invention will now be described, by way of example, with reference to the accompanying drawings, in which:

FIG. 4 is a section taken on the line 4—4 of FIG. 3;
FIG. 5 is a rear view taken in the direction of the arrow 5 of FIG. 2.

DESCRIPTION OF THE PREFERRED EMBODIMENT

Figure 1:
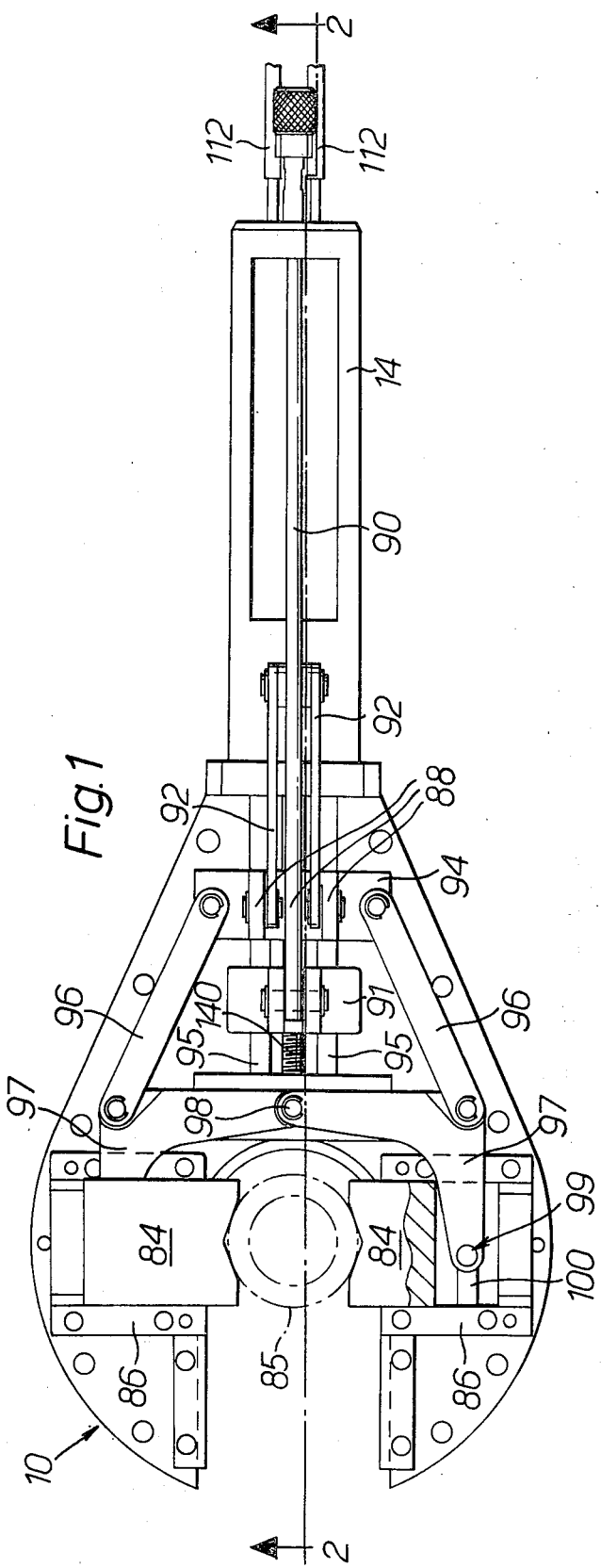
FIG. 1 is an under plan view of the torch.

The orbital welding torch 10 shown in the drawings includes a horse-shoe shaped body 12 having attached to it a support 14 extending away from the open mouth of the horse-shoe shaped body and also serving as a handle for the torch. This body rotatably supports a crescent shaped table 16 which carries a welding head 18.

The table 16 can slidably rotate within a part circular recess 19 in the body 12. This recess has an annular flange 19a which projects into and engages a corresponding recess 10a in the table 16 so maintaining the concentricity and alignment of the table during rotation and the making of a weld.

Attached to the underside of the table 16 is a crescent shaped pinion 22 which meshes with two pinions 24. As the crescent shaped pinion rotates with the table 16 its open mouth will become aligned with one or other of the pinions 24 driving the cresent shaped pinion 22 to ensure continuity of rotation. Each of the pinions 24 has a cylindrical sleeve 25 extending from it on which is mounted a drive sprocket 26, the pinions 24 and sprockets 26 being rotatably mounted on hollow bearings 28. The drive sprockets are driven by an endless belt 30 which also extends around an idler guide sprocket 32 rotatably mounted on a pin 34 fixed to the body 12 and a drive sprocket 35 mounted on the output shaft 36 of a right-angled gear 38. This is in turn driven from an electric motor 39 through a reduction gear 40 and insulated drive coupling 42. The motor 39 and gear 40 are housed in the support 14.

When the torch is to be inserted over a tube 44 to be welded, the open mouths of the table 16 and body 12 are aligned so that the tubes can enter. The table is then rotated relative the body carrying the welding head 18 around the weld region to make the weld and upon completion of the weld the open ends of the table and body must again be aligned to enable the torch to be removed from the welded tube.

Figure 6:
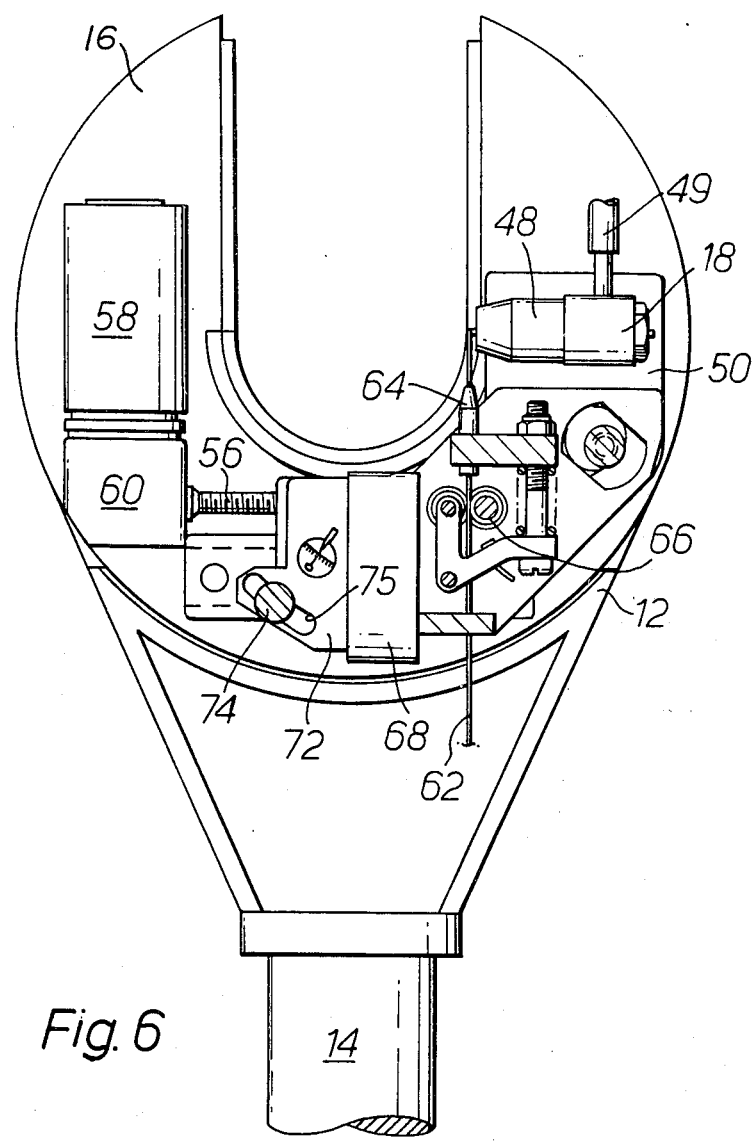
FIG. 6 is a top view of the structure of FIG. 5.
Figure 7:
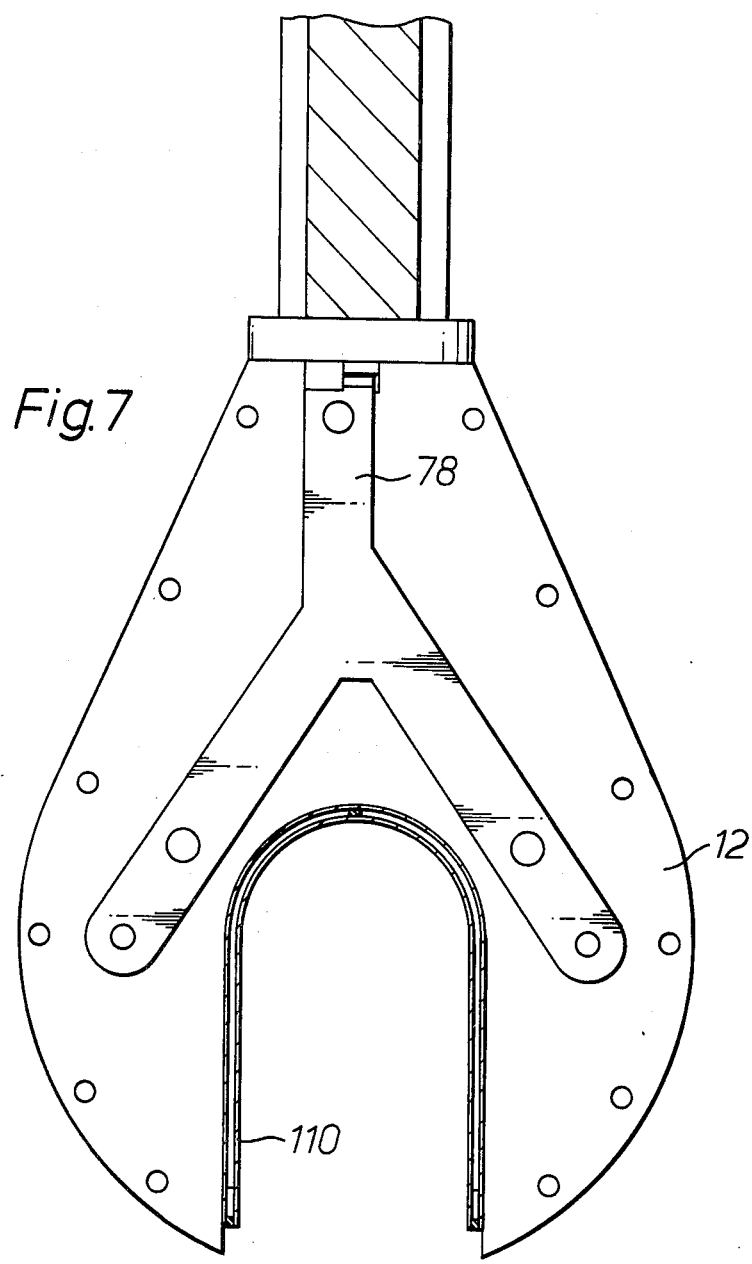
FIG. 7 is a section taken on the line 7—7 of FIG. 5.

The welding table 16 carries the welding head 18 which includes a non-consumable electrode 46 surrounded by a ceramic sleeve 48 to the interior of which argon shielding gas can be supplied for a tube 49 to blanket the weld region during welding. The head itself is mounted on a slide plate 50 which is slidably mounted on the table 16. It can slide left and right in the sense of FIG. 6 and it is constrained to slide in this direction by an inverted V-shaped piece 52 upstanding from the table 16 and extending within a correspondingly shaped recess in the plate 50. Screwed into a threaded bore 54 in the plate 50 is a threaded rod 56 driven by a D.C. electric motor 58 through a right-angle gear 60. Rotation of the motor therefore screws the rod 56 into or out of the plate 50 so moving it along the V-shaped piece 52 and so moving the tip of the electrode nearer to or further from the weld.

The actuation of the motor 58 is controlled in response of voltage variations across the welding arc so as to keep the welding gap between the tubes and the tip of the electrode 46 substantially constant. Thus these voltage variations are fed as signals to a control circuit, transposed and passed as voltages to the motor 58 and depending upon their value and sign, the motor will rotate one way or the other until the arc has been brought to the desired length.

Welding current is supplied to the torch 10 by a conducting lead 76 which is joined to a conducting rod 77 fitted within the support 14. Welded into the end of the rod 77 is a Y-shaped buzz-bar 78 embedded in the body 12. Extending up from the ends of the arms of the buzz-bar are two spring loaded commutator brushes 80 joined to the buzz-bar by leads 81 which bear against a part-circular commutator ring 82 fitted to the underside of the table 16. The brushes extend through the hollow interiors of the hollow bearings 28 of the sprockets 26. The brushes 80 are spaced diametrically around the ring 82 and so irrespective of the rotation of the cresent shaped table 16 and its open end, at least one brush will be in contact with the ring 82. From the ring 82 a conducting lead (not shown) passes into the electrode 46.

The welding torch 10 shown in the drawings has provision to feed welding wire 62 to the region of the weld during the making of a weld. The wire 62 is guided to the weld region through a sleeve 64 and advanced by passing between driven knurled nip rollers 66 and withdrawn from a reel (not shown). The rollers 66 are driven from an electric motor 68 through a reduction gearing 70. The sleeve 64, rollers 66, motor 68 and gearing 70 are mounted on a sub-plate 72 which is bolted to the plate 50 by bolts 74. One of these bolts passes through a curved slot 75 in the sub-plate 72 so that the precise direction of feed of the wire 62 from the sleeve 64 can be adjusted when the torch is set up for welding.

Two V-shaped clamping blocks 84 are slidably held in guides 86 fixed to the arms of the body 12. The guides 86 have projecting lugs 86a which project into slots 87 in the blocks 84. These blocks are retracted from the position shown in FIG. 1 during the mounting and de-mounting of the torch to allow the torch to fit over the tubes 85 to be welded. They are then advanced to clamp onto the tubes when the torch is in place and hold and align the torch during welding. In this connection the V-shaped clamping faces of the blocks 84 locate them accurately relative the tubes.

Figure 2:
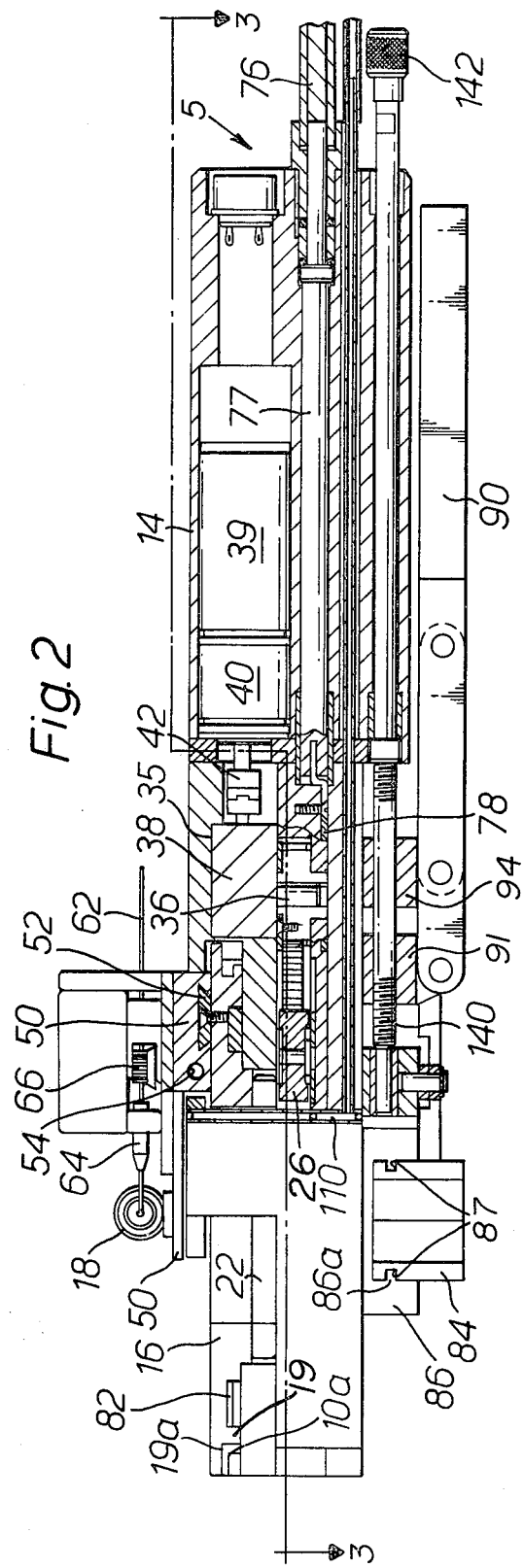
FIG. 2 is a section taken on the line 2—2 of FIG. 1.
Figure 3:
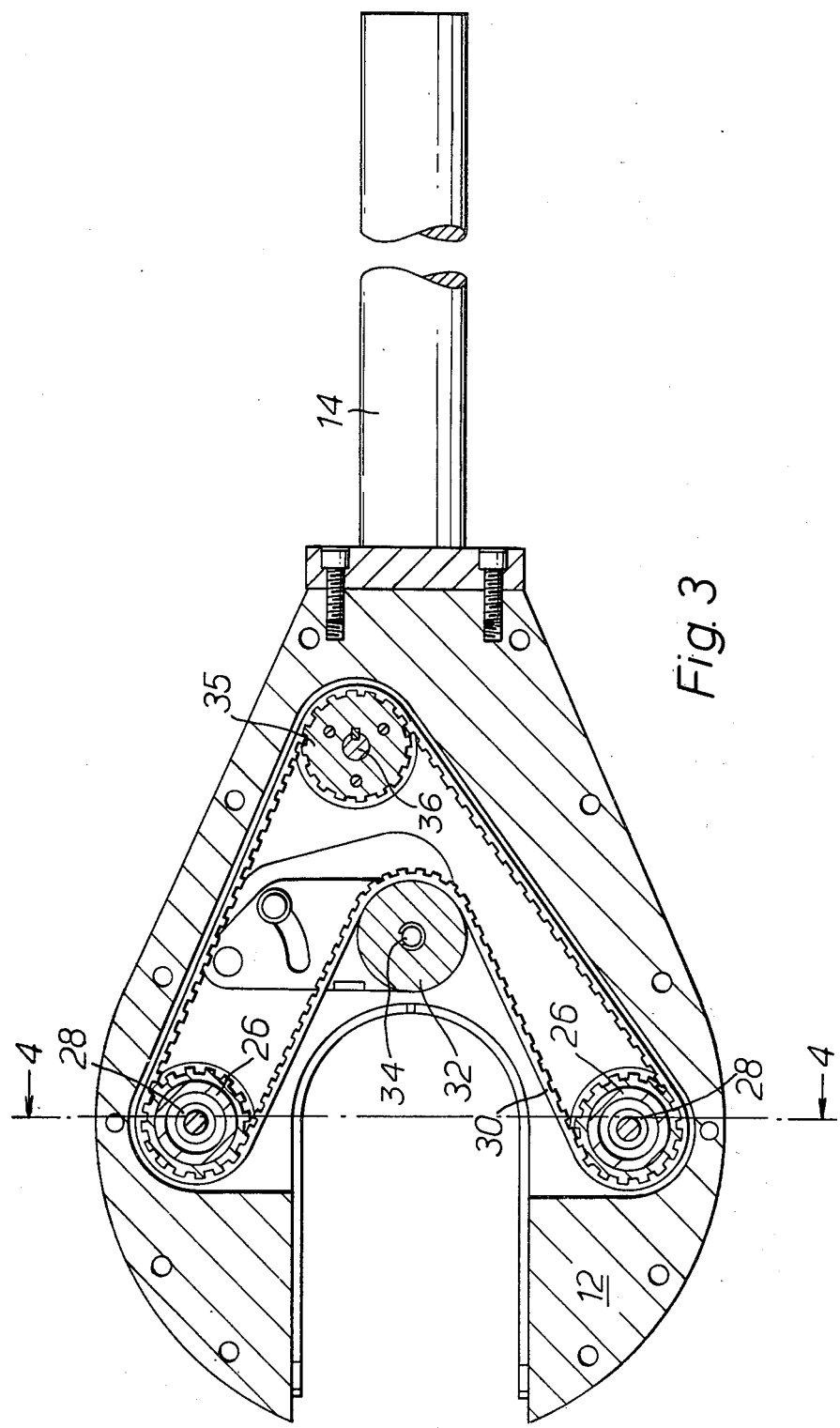
FIG. 3 is a section taken on the line 3—3 of FIG. 2.

The blocks 84 are moved between their advanced and locked position and retracted position by a clamping arrangement 88. This includes a lever 90 pivoted to a fixed block 91 and at an intermediate point along its length to two level links 92. These latter links are pivoted at their other ends to a block 94 slidable along two rods 95 fixed to the underside of the support 14. This block 94 in turn has pivoted to its end crank links 96 whose free ends are pivoted to two-armed cranks 97 pivoted near the end of one arm to a fixed pin 98. The ends of the other arms have cam pins 99 fitted to them which engage in transverse slots 100 in the clamping blocks 84. When the lever 90 is brought from an angled position to a position flat against the underside of the support 14 the block 94 is moved towards the left in the sense shown in FIG. 2 and this in turn causes the links 96 to push the cranks 97 inwardly towards one another so camming the clamping blocks 84 against the tubes 85. Because the pivot points along the lever 90 and along the links 92 are all aligned in the advanced positions of the blocks 84, they are locked into place against the tubes 85 and so can only be retracted by deliberate pivoting of the lever 90.

In order that the torch 10 may be used to weld a range of tube sizes, the lever 90 must be in the locking position against the support 14 with the blocks 84 advanced to different extents. This can be achieved by mounting the fixed block 91 so as to slide along the rods 95 and threading through it a threaded rod 140. This rod is rotatably journalled in the support 14 and has a knurled adjusted knob 142. Therefore by adjustment of the position of the fixed block 91 one can adjust the extent of advancement of the blocks 84 when in their locked position. In FIG. 1 the three concentric circles representing the tubes 85 show the limits of this adjustment.

A U-shaped hollow can 110 is fitted within the open mouth of the horse-shoe shaped body 12. Water is arranged to flow through this can to conduct away excessive heat which might otherwise have passed to the body 12. The cooling water is supplied along inlet and outlet tubes 112.

The argon gas supply tube 49 and the electric wires for the motors 39 and 58 are free to wind around the tubes being welded. They are all covered in a single sleeve for protection and after completion of a weld are unwound from the united tubes.

The orbital welding torch of the invention has the advantage that it can be inserted to extend partially around the tubes to be welded from one side of the tubes and then clamped in place. It is not necessary to have access to the other side of the tube. In addition the shaping of the body in the horse-shoe shape enables one to perform welds on individual tubes positioned in a row or wall of tubes spaced apart by no more than one tube diameter. For example when used to weld 2 inch outside diameter tubes with a clearance between adjacent tubes of 2 inches, the torch must have a maximum width of slightly under 6 inches which is readily possible with the design according to the invention.

The torch of the invention can be constructed from light materials such as aluminium and Delrin, with a few components such as the lever 90 and blocks 84 made of steel so that the torch can be an extremely light-weight production tool.

A latitude of modification, changed and substitution is inteded in the foregoing disclosure and in some instances some features of the invention will be employed without a corresponding use of other features. Accordingly it is appropriate that the appended claims be construed broadly and in a manner consistent with the spirit and scope of the invention herein.

What we claim is:

1. An orbital welding torch for butt welding tubes comprising:
    (a) a horse-shoe shaped body having an open mouth to enable said body to engage partially around the tubes to be butt welded when inserted from one side of the tubes,
    (b) a crescent shaped table having an open mouth rotatably carried by said body,
    (c) a welding head mounted on said table,
    (d) means for rotating said table relative to said body so as to orbit said head around the region of the weld, said open mouth of said body and said table being capable of alignment to enable said body to be inserted from one side of the tube to engage partially around the tube,
    (e) a pair of clamping blocks arranged to move in a direction which is substantially diametric relative to the tubes when the torch is in position to make a weld and is substantially transverse to the direction of insertion of the body whereby, once the torch has been inserted from one side of the tubes so that the body extends partially around the tubes, and
    (f) clamping means for moving said clamping blocks, comprising two cranks, each of said cranks being pivoted at one end to one of said clamping blocks and at the other end to the other of said cranks, a slideable block movable with respect to said body, a pair of crank links, each of said crank links being pivoted at one end to said block and at the other end to one of said cranks at a point between the ends of said one crank, a fixed block immovable with respect to said body, a lever pivoted at one end to said fixed block, and a lever link pivoted at one end to said slideable block and at the other end to said lever whereby moving said lever toward the plane of the body will cause said slideable block to move toward said tubes so that said crank links rotate said cranks to move said clamping blocks against said tubes to hold said torch in place during the making of a weld.

2. A welding torch according to claim 1 further comprising means for moving said welding head radially inwardly and outwardly relative said tubes to be welded to maintain a substantially constant arc length during welding.

3. A welding torch according to claim 2 wherein said means for moving said welding head comprises a plate slidably mounted on said table, and means constraining said plate to slide relative said table in a direction radial to the axis of rotation of said table relative said body.

4. A welding torch according to claim 3 further comprising a threaded bore in said plate, a threaded rod threaded into said bore and means for rotating said rod to cause said plate and welding head to move in said direction radial to said axis of rotation of said table.

5. A welding torch according to claim 1 in which said welding head includes a non-consumable electrode and said torch additionally comprises means for feeding welding wire to the region of said electrode.

6. A welding torch according to claim 5 in which said means for feeding welding wire include a sleeve through which said wire is fed, the sleeve being arranged to guide said wire to the region of the electrode, a plate adjustably mounted on said table and carrying said sleeve so that the orientation of said sleeve can be fixed as required.

7. A welding torch according to claim 6 further comprising bolts fixing said plate to said table, and a slot through said plate through which one of said bolts passes to enable the orientation of the plate relative said table to be fixed as required.

8. A welding torch according to claim 1 in which said means for rotating said table relative said body include a crescent shaped pinion fixed to said table, a pair of pinions mounted on said body diametrically positioned relative said axis of rotation of said table and meshing with said crescent shaped pinion, and drive means for said pinions.

9. A welding torch according to claim 8 in which said drive means include a motor and a single drive belt for transmitting drive from said motor to both pinions.

10. A welding torch according to claim 1 in which said welding table carries a part-circular conductive ring and said body has an electrical input and a pair of diametrically opposed brushes urged against said ring for transmitting welding current from said input to said welding head.

11. A welding torch according to claim 1 in which said clamping blocks have a V-shaped face which engages said tubes.

12. A welding torch according to claim 1 comprising guides mounted on said body in which said clamping blocks are constrained to slide in the direction radial to the axis of rotation of said table.

13. A welding torch according to claim 1 further comprising a hollow member covering the face of the crescent shaped table which extends partially around said tubes during welding, and means for passing cooling water through said hollow member.

14. A welding torch according to claim 1, wherein said fixed block can be adjusted in position in relation to said body, whereby the extent of advancement of said clamping blocks when in position to clamp a tube can be adjusted to suit the diameter of the tube by adjusting the position of said first block.

15. The welding torch defined in claim 14 wherein said clamping blocks each have a slot extending perpendicular to the direction said clamping blocks move when moving toward said tube, each of said cranks being pivoted to said clamping blocks by a cam pin slideably mounted in said slot.

16. The weld torch defined in claim 15 further comprising guide means on said body, said clamping blocks being guided by said guide means so that said clamping blocks can move only linearly toward and away from said tubes.

* * * * *